United States Patent
Keshavdas et al.

(10) Patent No.: US 10,642,951 B1
(45) Date of Patent: May 5, 2020

(54) REGISTER PULL-OUT FOR SEQUENTIAL CIRCUIT BLOCKS IN CIRCUIT DESIGNS

(71) Applicant: Xilinx, Inc., San Jose, CA (US)

(72) Inventors: Govinda Keshavdas, San Jose, CA (US); Anup K. Sultania, Livingston, AL (US); Chaithanya Dudha, San Jose, CA (US); Sabyasachi Das, San Jose, CA (US)

(73) Assignee: Xilinx, Inc., San Jose, CA (US)

(*) Notice: Subject to any disclaimer, the term of this patent is extended or adjusted under 35 U.S.C. 154(b) by 108 days.

(21) Appl. No.: 15/914,579

(22) Filed: Mar. 7, 2018

(51) Int. Cl.
*G06F 17/50* (2006.01)
*G06F 21/75* (2013.01)
*G06F 13/40* (2006.01)

(52) U.S. Cl.
CPC ...... *G06F 17/5081* (2013.01); *G06F 17/5045* (2013.01); *G06F 17/5077* (2013.01); *G06F 13/4068* (2013.01); *G06F 17/5072* (2013.01); *G06F 21/75* (2013.01); *G06F 2217/02* (2013.01)

(58) Field of Classification Search
CPC ...... G06F 21/75; G06F 21/85; G06F 13/4068; G06F 21/76; G06F 17/5081; G06F 17/5045; G06F 17/5072; G06F 17/5077; G06F 2217/02
See application file for complete search history.

(56) References Cited

U.S. PATENT DOCUMENTS

| | | | | |
|---|---|---|---|---|
| 4,138,719 A * | 2/1979 | Swanstrom | ................ | B41J 5/30 358/1.18 |
| 5,369,314 A * | 11/1994 | Patel | ................ | H03K 19/00392 326/13 |
| 5,499,192 A * | 3/1996 | Knapp | ................ | G06F 17/5054 716/102 |
| 5,787,489 A * | 7/1998 | Pawlowski | ................ | G11C 7/1039 365/189.05 |
| 6,501,677 B1 * | 12/2002 | Rau | ................ | H03K 19/1776 365/154 |
| 6,665,766 B1 * | 12/2003 | Guccione | ................ | G06F 17/5054 710/104 |
| 7,028,281 B1 * | 4/2006 | Agrawal | ................ | G06F 17/5054 326/41 |
| 7,123,247 B2 * | 10/2006 | Morita | ................ | G09G 3/3611 345/204 |
| 7,203,919 B2 * | 4/2007 | Suaris | ................ | G06F 17/5031 716/108 |
| 7,266,661 B2 * | 9/2007 | Walmsley | ................ | G06F 21/75 711/164 |
| 7,289,096 B2 * | 10/2007 | Jeon | ................ | G09G 3/3648 345/100 |

(Continued)

*Primary Examiner* — Helen Rossoshek
(74) *Attorney, Agent, or Firm* — Kevin T. Cuenot

(57) ABSTRACT

Register pull-out for sequential circuit blocks may include determining, using computer hardware, a net of a circuit design having a driver that is a macro circuit block driving a plurality of loads and determining, using the computer hardware, a placement difficulty of the net based upon a type of the driver and number and type of the plurality of loads. In response to determining that the placement difficulty of the net exceeds a threshold placement difficulty, the computer hardware is capable of modifying the circuit design by pulling a register from the driver to a location on a device external to the driver and changing internal logic of the driver based upon the pulled register.

20 Claims, 5 Drawing Sheets

(56) References Cited

U.S. PATENT DOCUMENTS

| | | | | |
|---|---|---|---|---|
| 7,392,445 B2* | 6/2008 | Borkenhagen | G06F 11/2005 | 370/216 |
| 7,535,254 B1* | 5/2009 | Case | H03K 19/17732 | 326/39 |
| 7,987,086 B2* | 7/2011 | Van Huben | G06F 17/5022 | 703/16 |
| 8,166,427 B1* | 4/2012 | Pathak | G06F 17/5054 | 716/104 |
| 8,291,364 B2* | 10/2012 | Panigrahi | G06F 17/5031 | 326/101 |
| 8,332,793 B2* | 12/2012 | Bose | G06F 17/5068 | 716/108 |
| 8,332,802 B2* | 12/2012 | Haugestuen | G06F 17/5036 | 716/133 |
| 8,499,266 B2* | 7/2013 | Chan | G06F 17/5031 | 716/106 |
| 8,667,346 B2* | 3/2014 | Iwami | G01R 31/318536 | 714/718 |
| 8,762,909 B1* | 6/2014 | Koenig | G06F 17/5031 | 716/108 |
| 8,914,682 B2* | 12/2014 | Busch | G06F 11/2215 | 714/30 |
| 9,069,920 B2* | 6/2015 | Tian | G06F 17/5045 | |
| 10,242,150 B1* | 3/2019 | Das | G06F 17/5081 | |
| 2004/0143613 A1* | 7/2004 | Clemen | G06F 7/483 | 708/233 |
| 2004/0181303 A1* | 9/2004 | Walmsley | B41J 2/04505 | 700/115 |
| 2004/0243964 A1* | 12/2004 | McElvain | G06F 17/5031 | 716/112 |
| 2005/0132316 A1* | 6/2005 | Suaris | G06F 17/5031 | 716/108 |
| 2007/0180006 A1* | 8/2007 | Gyoten | G06F 13/1652 | 708/200 |
| 2008/0209038 A1* | 8/2008 | Tufano | G06F 17/5072 | 709/225 |
| 2009/0248955 A1* | 10/2009 | Tamada | G06F 12/0638 | 711/102 |
| 2013/0151919 A1* | 6/2013 | Huynh | G06F 1/26 | 714/746 |
| 2013/0194396 A1* | 8/2013 | Sonobe | H04N 13/30 | 348/51 |
| 2014/0143743 A1* | 5/2014 | Tian | G06F 17/5045 | 716/103 |
| 2016/0239043 A1* | 8/2016 | Galloway | G06F 13/4068 | |
| 2016/0299860 A1* | 10/2016 | Harriman | G06F 13/36 | |
| 2019/0087606 A1* | 3/2019 | Subhaschandra | G06F 21/76 | |

* cited by examiner

REGISTER PULL-OUT FOR SEQUENTIAL CIRCUIT BLOCKS IN CIRCUIT DESIGNS

TECHNICAL FIELD

This disclosure relates to integrated circuits (ICs) and, more particularly, to techniques for pulling registers out from sequential circuit blocks in a circuit design for implementation within an IC.

BACKGROUND

Implementing a circuit design within an integrated circuit (IC), whether a programmable IC or an application specific IC (ASIC), entails processing the circuit design through a design flow. The design flow includes multiple, different phases. These phases generally include synthesis, placement, and routing. In general, synthesis refers to the process of generating a gate-level netlist from a high-level description of a circuit or system. Placement refers to the process of assigning elements of the synthesized circuit design to particular instances of circuit blocks and/or resources having specific locations on the target IC. Routing is the process of selecting or implementing particular routing resources, e.g., wires and/or other interconnect circuitry, to electrically couple the various circuit blocks of the target IC after placement.

Modern circuit designs often have aggressive timing requirements. Significant time is spent processing the circuit design through the design flow in an attempt to meet these timing requirements. The distance between elements of the circuit design post placement accounts for a significant portion of the delay in the circuit design and whether the circuit design, as implemented within the target IC, will meet established timing requirements.

SUMMARY

In one or more embodiments, a method can include determining, using computer hardware, a net of a circuit design having a driver that is a macro circuit block driving a plurality of loads and determining, using the computer hardware, a placement difficulty of the net based upon a type of the driver and number and type of the plurality of loads. The method can include, in response to determining that the placement difficulty of the net exceeds a threshold placement difficulty, modifying, using the computer hardware, the circuit design by pulling a register from the driver to a location on a device external to the driver and changing internal logic of the driver based upon the pulled register.

In one or more embodiments, a system includes a memory configured to store program code and a processor coupled to the memory. The processor, in response to executing the program code, is configured to initiate operations. The operations can include determining a net of a circuit design having a driver that is a sequential circuit block driving a plurality of loads and determining a placement difficulty of the net based upon a type of the driver and number and type of the plurality of loads. The operations can include, in response to determining that the placement difficulty of the net exceeds a threshold placement difficulty, modifying the circuit design by pulling a register from the driver to a location on a device external to the driver and changing internal logic of the driver based upon the pulled register.

In one or more embodiments, a computer program product includes a computer readable storage medium having program code stored thereon. The program code is executable by a processor to perform operations. The operations can include determining a net of a circuit design having a driver that is a sequential circuit block driving a plurality of loads and determining a placement difficulty of the net based upon a type of the driver and number and type of the plurality of loads. The operations can include, in response to determining that the placement difficulty of the net exceeds a threshold placement difficulty, modifying the circuit design by pulling a register from the driver to a location on a device external to the driver and changing internal logic of the driver based upon the pulled register.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
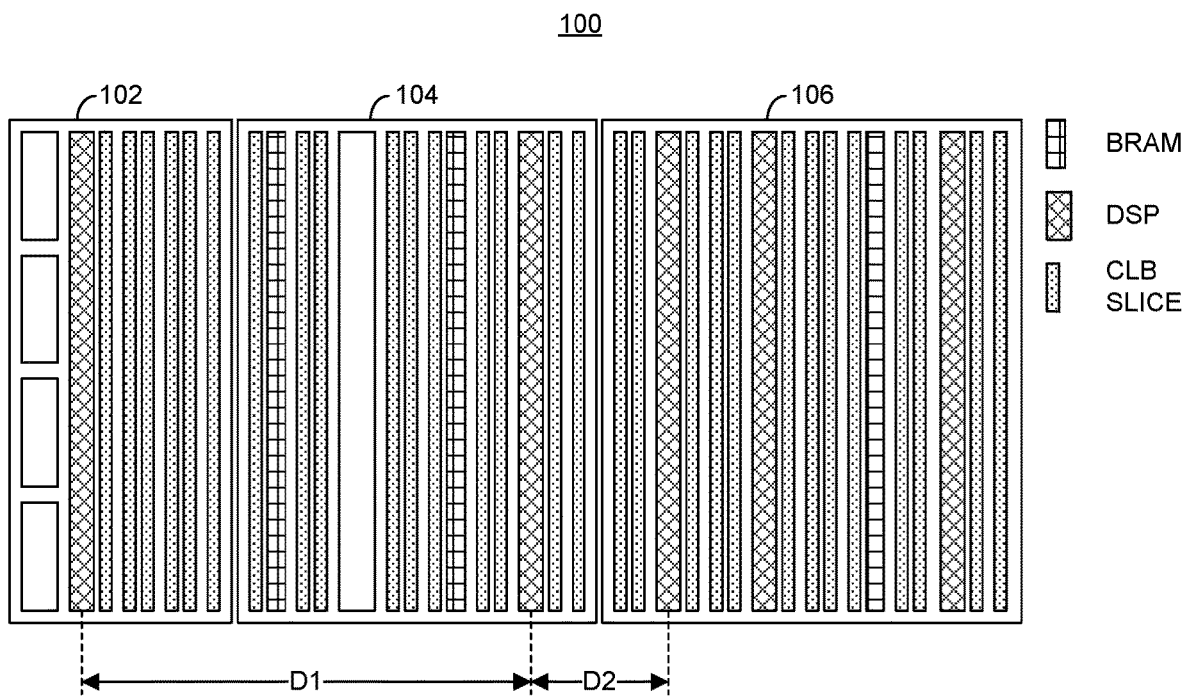
FIG. 1 illustrates an example architecture for an integrated circuit.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to techniques for pulling registers out from selected types of circuit blocks in a circuit design for implementation within an IC (e.g., the "target IC"). In accordance with the inventive arrangements described within this disclosure, a system is capable of processing a circuit design to identify nets that have particular attributes. These attributes are positively correlated with increased difficulty in placing the nets. This may be particularly true in cases where utilization of the resources of the target IC by the circuit design is high. Examples of attributes that may be used by the system for net selection may include, but are not limited to, the type of driver of the net, the type(s) of the loads of the net, and/or the number of loads of the net. The system is capable of selecting nets with the desired attributes for processing.

In one or more embodiments, the system selects nets for processing based upon placement difficulty of the nets. The system is capable of determining a placement difficulty of a net by calculating a placement difficulty for the driver of the net and also calculating a placement difficulty of the load(s) of the net. In particular embodiments, the system sums the placement difficulty of the driver with the placement difficulty of the load(s) to determine the placement difficulty of the net. For those nets having a placement difficulty greater than a threshold placement difficulty, the system is capable of modifying the circuit design to reduce the difficulty of placing and/or routing the net.

In particular embodiments, the system pulls a register out from the driver of the net. For example, the driver of the net may be a sequential circuit block that is considered a "macro" circuit block. A macro circuit block refers to a primitive available within the target IC. A primitive refers to a circuit block that may not be subdivided and/or is treated as an atomic or unified element for purposes of technology mapping the circuit design and/or routing. A macro circuit block includes programmable circuitry and one or more registers. The registers may be used to separate the signal path through the macro circuit block into two or more stages of circuitry. One or more of the register(s) of a macro circuit block may be included in the signal path through the macro circuit block or may be bypassed based upon configuration data. For example, configuration data loaded into the target IC may program or configure the macro circuit block thereby including such register(s) in the signal path or bypassing such register(s) (e.g., excluding such register(s) from the signal path). Registers of a macro circuit block may be bypassed on a per-register basis.

By "pulling" a register out from the macro circuit block, the system effectively bypasses the register within the macro circuit block thereby removing or excluding the register from the signal path through the macro circuit block. The system utilizes another register that is external to the macro circuit block in lieu of the bypassed register. Because the availability of register primitives within the target IC is greater than the availability of the primitives for the driver of the net (e.g., the macro circuit block), the placer has significantly more freedom for placing the register outside of the macro circuit block. The register outside of the macro circuit block becomes the driver of the loads of the net. The system is capable of placing the register at a location on the target IC that is more suitable for driving the loads of the net while meeting timing requirements.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example architecture 100 for an IC. Architecture 100 may be used to implement a programmable IC. A programmable IC refers to an IC that includes at least some programmable circuitry. The programmable circuitry may be included in the IC with one or more other circuits and/or systems such as a processor or other hardwired circuit blocks (e.g., application-specific circuitry or an ASIC). An example of a programmable IC is a field programmable gate array (FPGA).

In the example of FIG. 1, architecture 100 includes multiple dies 102, 104, and 106. Dies 102, 104, and 106 may be coupled to an interposer die (not shown) including inter-die wires that facilitate communication among dies 102, 104, and 106. Each of dies 102, 104, and 106 includes a plurality of columns of programmable circuit blocks. For purposes of illustration, architecture 100 includes columns of block random access memories (BRAMs), columns of digital signal processing blocks (DSPs), and columns of configurable logic block slices (CLB slices). Each different type of circuit block is represented using a different type of shading in FIG. 1.

In the example of FIG. 1, BRAMs and DSPs are considered macro circuit blocks. In one or more embodiments, nets having a macro circuit block as a driver may be eligible for processing. FIG. 1 illustrates that the wire distance between different columns of macro circuit blocks may vary significantly for purposes of timing. For example, the distance D1 in FIG. 1 illustrates the distance from a first column of DSPs to a second column of DSPs. As illustrated, in order to couple a DSP from the first column to a DSP in the second column, the net must traverse across 14 CLB slice columns and 2 BRAM columns. The distance D1 further includes traversing an inter-die wire coupling die 102 to die 104. The distance from the second column of DSPs to the third column of DSPs is represented by the distance D2. As illustrated, in order to couple a DSP from the second column of DSPs to a DSP in the third column of DSPs, the wire traverses across 4 CLB slice columns. Further, the distance D2 includes traversing an inter-die wire coupling die 104 to die 106.

As illustrated by FIG. 1, depending upon placement of macro circuit blocks of the circuit design to available primitives on the target IC, the wirelength and delay may vary significantly. This means that the placement process becomes less reliable particularly in cases where the circuit design utilizes a high percentage of the available primitives on the target IC.

Nets with multiple loads (e.g., "multiple" fanout nets or "high" fanout nets) that have a macro circuit block as a driver and/or as one or more loads may be difficult to place given the inconsistent distance between different columns of like or same primitives. This constrains the placer and often prevents the placer from achieving a high quality of result. Further, as discussed, the placer often requires more time to finish execution, thereby increasing the time required for a system to implement a circuit design within the target IC. While FIG. 1 illustrates differing distances in general, it should be appreciated that routes that span from one die to another die further complicate and exacerbate the difficulty in placing the varieties of nets described.

Figure 2:
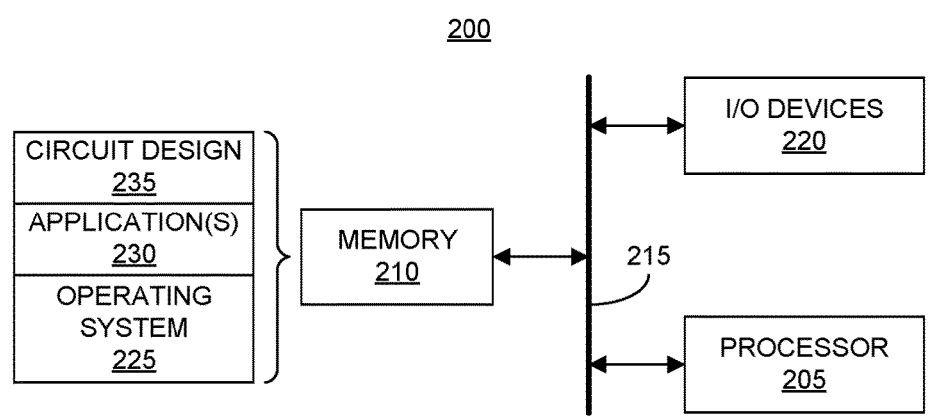
FIG. 2 illustrates an example system for use with one or more embodiments described herein.

FIG. 2 illustrates an example system 200 for use with one or more embodiments described herein. System 200 is an example of computer hardware that may be used to implement a computer, a server, a portable computer such as a laptop or a tablet computer, or other data processing system. A system or device implemented using computer hardware is capable of performing the various operations described herein relating processing a circuit design for implementation within an IC.

In the example of FIG. 2, system 200 includes at least one processor 205. Processor 205 is coupled to memory 210 through interface circuitry 215. System 200 stores computer readable instructions (also referred to as "program code")

within memory 210. Memory 210 is an example of computer readable storage media. Processor 205 is capable of executing the program code accessed from memory 210 via interface circuitry 215.

Memory 210 may include one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM", synchronous DRAM or "SDRAM", and double data rate RAM or "DDR RAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 200 may also include one or more cache memories (not shown) that provide temporary storage of at least some program code in order to reduce the number of times program code must be retrieved from a bulk storage device during execution.

Memory 210 is capable of storing program code and/or data. For example, memory 210 is capable of storing various routines, programs, objects, components, logic, other suitable instructions, and/or other data structures. For purposes of illustration, memory 210 stores an operating system 225, one or more application(s) 230, and a circuit design 235. In one or more embodiments, application(s) 230 include an electronic design automation (EDA) application. The EDA application is capable of performing one or more operations of a design flow (e.g., synthesis, placement, routing, and/or bitstream generation) and the various operations described herein on circuit design 235 to implement circuit design 235 within a target IC. The target IC may have an architecture the same as or similar to the architecture described in connection with FIG. 1.

System 200, e.g., processor 205, is capable of executing operating system 225 and application(s) 230 to perform the operations described within this disclosure. As such, operating system 225 and application(s) 230 may be considered an integrated part of system 200. Further, it should be appreciated that any data used, generated, and/or operated upon by system 200 (e.g., processor 205) are functional data structures that impart functionality when employed as part of the system.

Examples of interface circuitry 215 include, but are not limited to, a system bus and an input/output (I/O) bus. Interface circuitry 215 may be implemented using any of a variety of bus architectures. Examples of bus architectures may include, but are not limited to, Enhanced Industry Standard Architecture (EISA) bus, Accelerated Graphics Port (AGP), Video Electronics Standards Association (VESA) local bus, Universal Serial Bus (USB), and Peripheral Component Interconnect Express (PCIe) bus.

System 200 further may include one or more I/O devices 220 coupled to interface circuitry 215. I/O devices 220 may be coupled to system 200, e.g., interface circuitry 215, either directly or through intervening I/O controllers. Examples of I/O devices 220 include, but are not limited to, a keyboard, a display device, a pointing device, one or more communication ports, a network adapter, etc. A network adapter refers to circuitry that enables system 200 to become coupled to other systems, computer systems, remote printers, and/or remote storage devices through intervening private or public networks. Modems, cable modems, Ethernet cards, and wireless transceivers are examples of different types of network adapters that may be used with system 200.

System 200 may include fewer components than shown or additional components not illustrated in FIG. 2 depending upon the particular type of device and/or system that is implemented. In addition, the particular operating system, application(s), and/or I/O devices included may vary according to system type. Further, one or more of the illustrative components may be incorporated into, or otherwise form a portion of, another component. For example, a processor may include at least some memory. System 200 may be used to implement a single computer or a plurality of networked or interconnected computers each implemented using the architecture of FIG. 2 or an architecture similar thereto.

The inventive arrangements described within this disclosure are capable of modifying circuit design 235 to obtain an improved quality of result (QOR) compared to other conventional implementation techniques. The QOR is realized through physical synthesis such as placement and/or routing. Further, the improved QOR is realized in the target IC in which circuit design 235 is implemented post place and route. By applying the various techniques described herein, system 200 is capable of modifying circuit design 235 to operate at clock speeds higher than otherwise attainable due, at least in part, to the improved placement and/or routing that is achieved. The techniques described herein are capable of reducing the wirelength within circuit design 235 thereby reducing signal delays and facilitating the increased clock speeds described.

The inventive arrangements described within this disclosure are also capable of providing improved operation of the implementation tools, e.g., system 200 itself. System 200, for example, is capable of performing the operations necessary for implementation of circuit design 235, e.g., placement and/or routing, in less time than would otherwise be the case had the operations described herein not been performed. Thus, the inventive arrangements support faster execution and operation of system 200 while performing various stages of a design flow.

In one or more embodiments, system 200 is capable of modifying circuit design 235. System 200 is capable of applying the techniques described herein relating to selecting nets for processing, pulling out registers for the selected nets, and/or performing replication for the selected nets. By performing the operations described, system 200 is capable of placing and/or routing circuit design 235 in less time than had such modifications not been performed while also meeting established timing requirements. Otherwise, the complexity of trying to determine a placement and/or routing solution for nets having the characteristics described herein while still meeting timing may cause system 200 to iterate more than would otherwise be the case in order to investigate additional solutions that are unlikely to meet the timing requirements of circuit design 235.

Figure 3A:
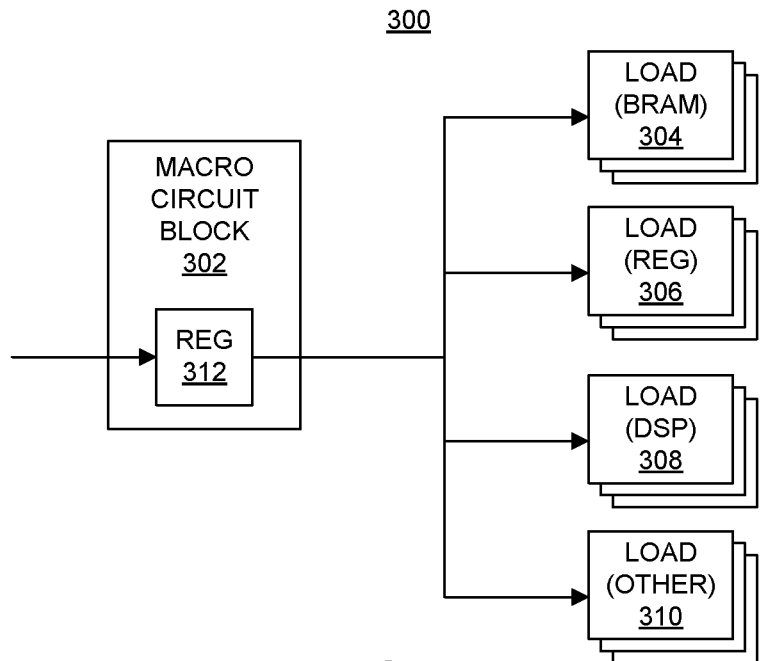
FIGS. 3A and 3B, referred to collectively as FIG. 3, illustrate an example modification of a net that may be performed by the system of FIG. 2.
Figure 3B:
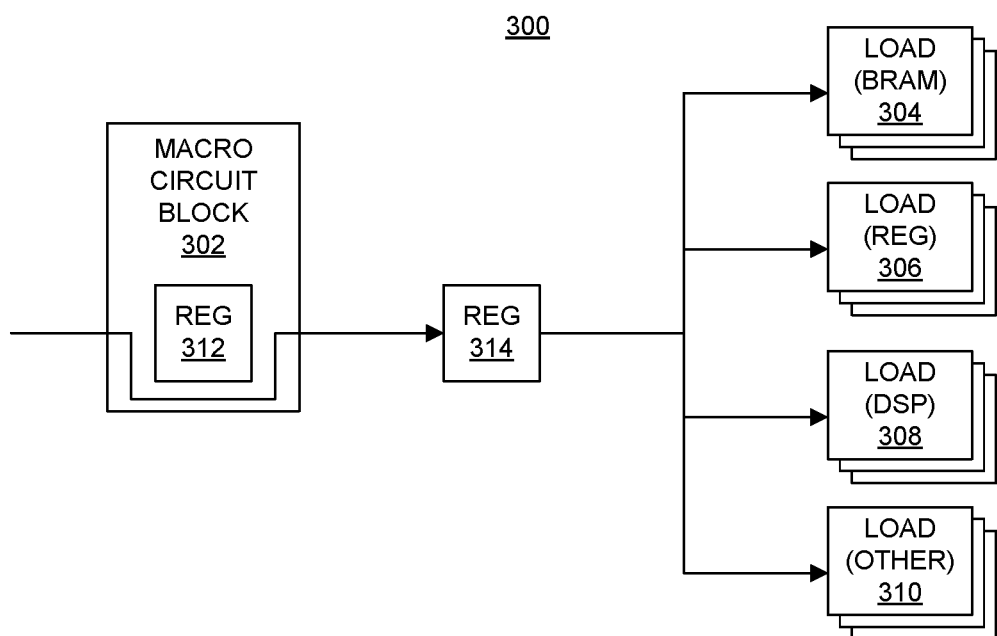

FIGS. 3A and 3B, referred to collectively as FIG. 3, illustrate an example modification of a net 300 that may be performed by system 200 of FIG. 2. Net 300 may be included in circuit design 235 of FIG. 2. As such, net 300 may be placed and routed for implementation in example architecture 100 of FIG. 1 and/or in another IC architecture.

In the example of FIG. 3A, the driver of net 300 is macro circuit block 302. Macro circuit block 302 includes a register 312 (abbreviated in FIG. 3 as "REG") that, at least initially, is configured to be included in the signal path through macro circuit block 302 for net 300. Though not shown, macro circuit block 302 may include one or more additional registers in the signal path that precede register 312. Examples of macro circuit block 302 may include, but are not limited to, a BRAM, a DSP, shift register logic (SRL), an Ultra DSP, and/or an UltraRAM (URAM). In each of the examples listed, the macro circuit block includes programmable circuitry for performing a particular function such as DSP and/or other mathematical operations, memory, or other circuitry in addition to one or more registers that may be bypassed.

Macro circuit block 302 drives a plurality of different loads 304, 306, 308, and 310. As illustrated, macro circuit block 302 is capable of driving multiple different types of loads such as BRAMs (loads 304), multiple different registers (loads 306), multiple different DSPs (loads 308), and multiple other circuit elements (loads 310). Macro circuit block 302 may drive hundreds of different loads. Referring to FIG. 1, one can see that depending upon the type of macro circuit block 302 and the type and/or number of loads 304, 306, 308, and 310, achieving a placement solution for net 300 that satisfies timing requirements may be difficult. The type of the driver, the number of loads, and the type(s) of loads may significantly constrain the available solutions given the architecture of the target device. In the case of FIG. 1, for example, register type primitives, being available within CLB slices, are more numerous than BRAM and/or DSP type primitives.

FIG. 3B illustrates operations performed by system 200 of FIG. 2. FIG. 3B illustrates how system 200 pulls register 312 of macro circuit block 302 out of macro circuit block 302 and uses register 314 to drive loads 304, 306, 308, and 310 of net 300. In the example of FIG. 3B, system 200 includes another register 314 in the signal path between macro circuit block 302 and loads 304, 306, 308, and 310. Register 314 is a register that is located external to macro circuit block 302. For example, register 314 may be located in a CLB slice as described in connection with FIG. 1. Accordingly, system 200 is further capable of modifying circuit design 235 and, more particularly, macro circuit block 302, to bypass register 312 included therein. For purposes of discussion, though register 314 represents an entirely different register primitive than register 312, register 314 may be referred to herein as the "pulled register" or the "pulled-out register" from time-to-time.

The example register pull-out operation illustrated in FIG. 3 provides a placer with greater flexibility in routing net 300. For example, referring to FIG. 1, one can see that the available register primitives, e.g., CLB slices, are more numerous than primitives for either DSP or BRAM type macro circuit blocks. As such, depending upon the type of the driver and the number and type(s) of loads of net 300, register 314 may be placed at a location that is conducive to meeting the timing requirements of net 300. Referring to the distance D1, pulling a register from a DSP allows that register to be placed in any of the CLB slice columns traversed by distance D1. Register 314 may be placed at a location that is not constrained by the type of the macro circuit block of the driver (e.g., macro circuit block 302) and the limited availability of primitives for such macro circuit block.

In the example of FIG. 3, the system "pulls" a register by placing the register initially located at a register primitive within the driver macro circuit block at a register primitive that is located external to the driver macro circuit block. In consequence, the register primitive within the driver macro circuit block is bypassed. The loads of the net are driven by the register placed at the register primitive external to the driver macro circuit block.

Figure 4:
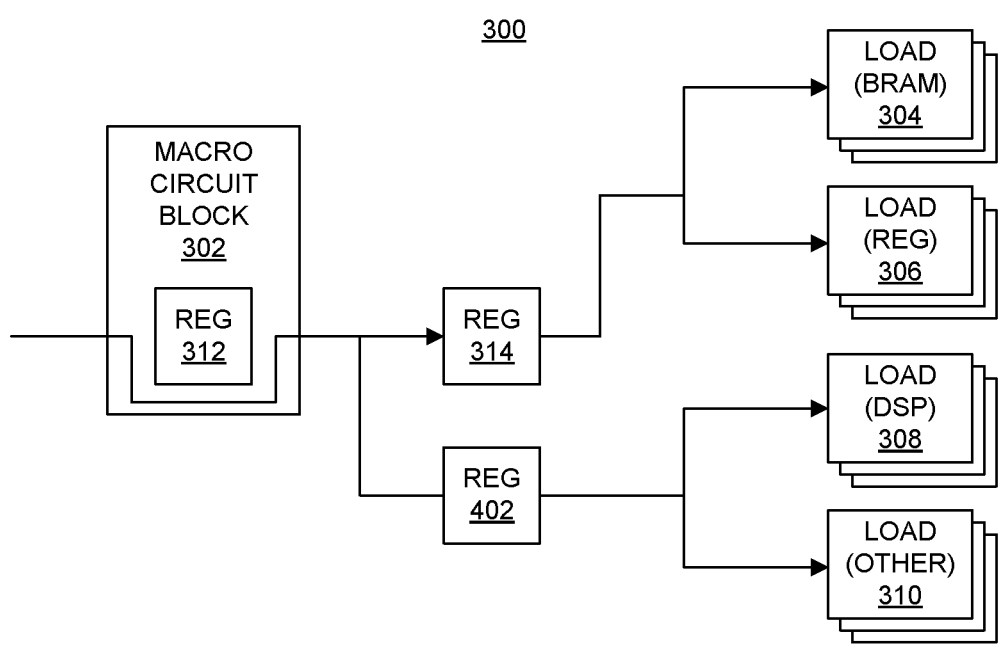
FIG. 4 illustrates an example of replication.

FIG. 4 illustrates an example of replication. In the example of FIG. 4, net 300 of FIG. 3B is further processed by the system by performing replication. As pictured, the system has replicated register 314 by inserting an additional register 402. Register 402, like register 314, is external to macro circuit block 302. The loads 304, 306, 308, and 310 are apportioned among register 314 and register 402. In the example of FIG. 4, register 314 drives loads 304 and 306, while register 402 drives loads 308 and 310. It should be appreciated that the apportionment of loads shown in FIG. 4 is for purposes of illustration. In one or more embodiments, loads 304, 306, 308, and 310 may be apportioned to, and thus, driven by, either register 314 or register 402 in any combination. For example, register 314 may drive one or more of loads 304, one or more of loads 306, one or more of loads 308, and/or one or more of loads 310. In that case, register 402 drives the remainder of loads 304, 306, 308, and/or 310 not driven by register 314.

The example of FIG. 4 illustrates how replication provides the system with even greater flexibility in placing and routing net 300. In addition to selecting an advantageous placement (e.g., location) for register 314, the system is also able to select an advantageous placement for register 402. Determining an advantageous placement for each register may be performed in a more computationally efficient manner compared to placing macro circuit block 302 while using register 312 due to the greater availability of register primitives compared to primitives for macro circuit block 302.

Figure 5:
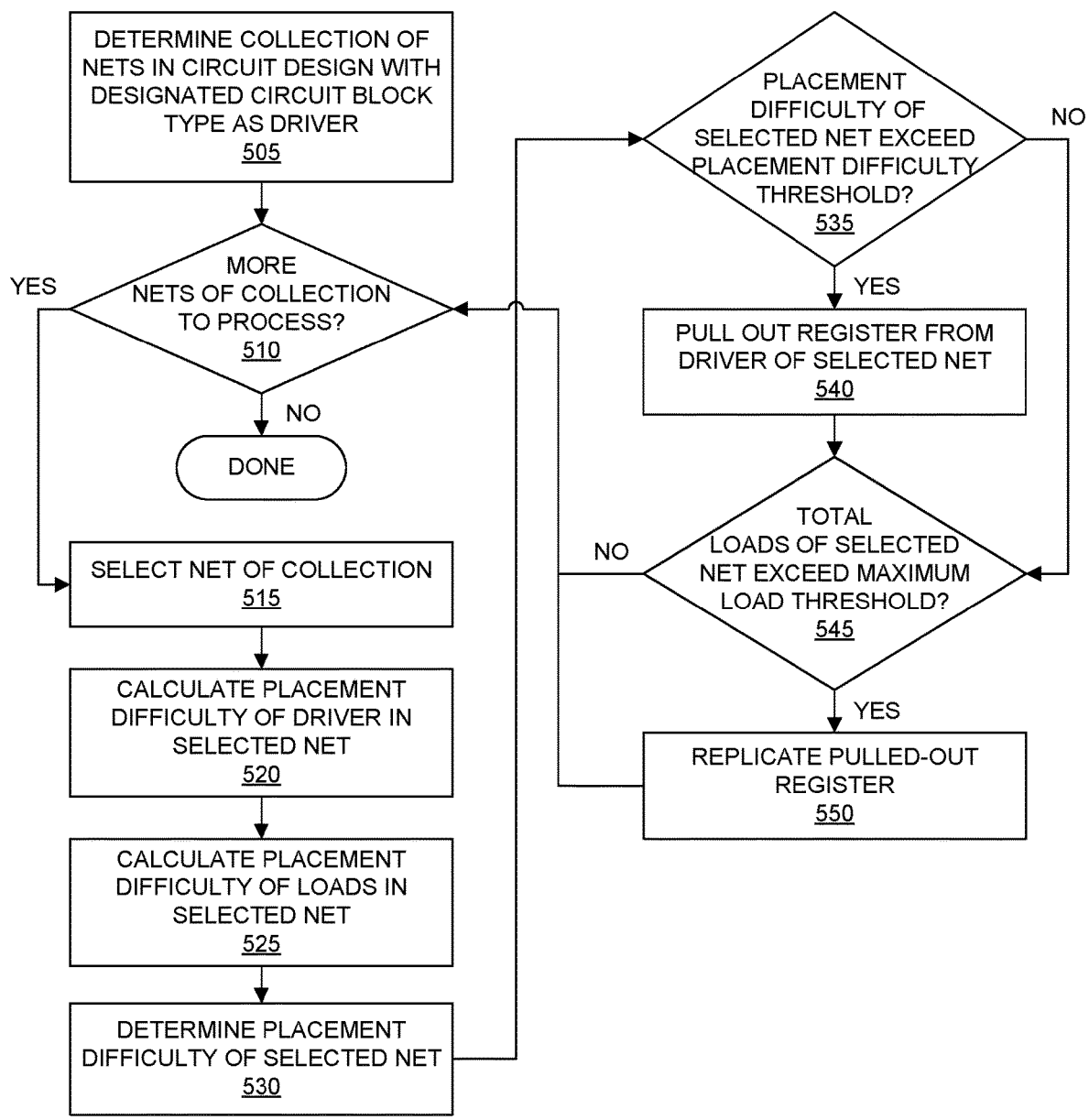
FIG. 5 illustrates an example method of register pull-out.

FIG. 5 illustrates an example method 500 register pull-out. Method 500 may be performed by a system as described in connection with FIG. 2.

In block 505, the system is capable of determining a collection of nets in a circuit design with a designated type of circuit block as the driver. In one or more embodiments, the circuit design is a netlist or another circuit representation that has been synthesized. In one or more embodiments, the designated type of circuit block is a macro circuit block. In particular embodiments, the designated type of circuit block is a particular type of macro circuit block. For example, the designated type of circuit block may be a BRAM, SRL, a DSP, an Ultra DSP, a URAM, or another predetermined macro circuit block.

In block 510, the system determines whether there are additional nets in the collection of nets to process. If so, method 500 continues to block 515. If not, method 500 may end. In block 515, the system selects a net from the collection of nets that has not yet been processed.

In block 520, the system calculates the placement difficulty of the driver in the selected net. The placement difficulty of the driver may be denoted $P_{driver}$. In one or more embodiments, the placement difficulty of the driver depends upon the number of primitives of the same type as the driver in the target device, which is denoted as $N_d$, and the number of total primitives in the target device across types, which is denoted as $N_p$. In particular embodiments, the system calculates the placement difficulty of the driver $P_{driver}$ using Expression 1.

$$P_{driver} = N_d/N_p \qquad (1)$$

As an example, if the type of driver of the selected net is a BRAM, the placement difficulty of the driver in this example is the number of BRAM primitives available on the target device divided by the total number of primitives on the device. The total number of primitives on the target devices is the sum of the number of each type of primitive available on the target device (e.g., the sum of the number of BRAM primitives, the number of DSP primitives, the number of CLB primitives, and any other primitives available on the target device for placing components of the circuit design).

In block 525, the system calculates the placement difficulty of loads in the selected net. The placement difficulty of the loads may be denoted as $P_{loads}$. In one or more embodiments, the placement difficulty of the loads depends upon the number of loads and the type(s) of the loads of the selected net. In particular embodiments, the system calculates the placement difficulty of the loads $P_{loads}$ using Expression 2.

$$P_{loads} = \sum_{i=0}^{NumOfLoads} W_{Li} \frac{N_{Li}}{N_p} \quad (2)$$

Within Expression 2, the term NumOfLoads represents the number of the loads of the selected net. The term $W_{Li}$ represents a weight that may be set within the system on a per-primitive type basis. In other words, each different type of primitive available on the target IC may have a weight $W_{Li}$ associated therewith that is used for purposes of calculating Expression 2. As such, DSPs may have a particular weight, while BRAMs have another weight that is independent of the weight used for DSPs, and so on. Weights may differ among different types or be the same. The term $N_{Li}$ represents the number of primitives available in the target device for the type of load corresponding to a particular load i of the net. The term $N_p$ has been discussed above in connection with block 520.

In the example of FIG. 5, the quantities $W_{Li}$, $N_{Li}$, and $N_p$ are specific to the particular target IC being used. The quantities $W_{Li}$, $N_{Li}$, and $N_p$ are not dependent upon the circuit design. As such, in one or more embodiments, the system is capable of storing the quantities $W_{Li}$, $N_{Li}$, and $N_p$ prior to the start of method 500 for use during operation to save runtime.

In block 530, the system calculates the placement difficulty of the selected net. The placement difficulty of the selected net is denoted as $P_{net}$. In one or more embodiments, the system adds the placement difficulty of the source and the placement difficulty of the loads to obtain the placement difficulty of the selected net. For example, the system may calculate the placement difficulty of the selected net using Expression 3.

$$P_{net} = P_{driver} + P_{loads} \quad (3)$$

In block 535, the system compares the placement difficulty $P_{net}$ of the selected net with a threshold placement difficulty. The system determines whether the placement difficulty of the selected net exceeds the placement difficulty threshold. In response to determining that the placement difficulty of the selected net exceeds the placement difficulty threshold, method 500 may continue to block 540. In response to determining that the placement difficulty of the selected net does not exceed the placement difficulty threshold, method 500 may continue to block 545. In one or more other embodiments, in response to determining that the placement difficulty of the selected net does not exceed the placement difficulty threshold, method 500 may continue to block 510 to process further nets and omit the possibility of performing replication in blocks 545 and 550.

In block 540, the system pulls a register from the driver of the selected net. For example, the system inserts a register into the circuit design between the driver and the loads. The register inserted by the system is a register that is external to, e.g., independent of, the driver of the selected net. The system connects an output of the inserted register to the loads of the selected net. The system connects an input of the inserted register to an output of the driver. Accordingly, the inserted register becomes the new driver of the selected net (e.g., the "pulled register). Further, as part of pulling the register from the driver, the system is capable of configuring the driver. For example, the system is capable of generating the configuration data necessary to program the driver so that the register that previously drove the loads of the selected net within the driver is bypassed or excluded from the signal path as illustrated in connection with FIG. 3. The system effectively pulls a register from the driver to a location (e.g., register primitive) external to the driver and changes internal logic of the driver based upon the pulled register (e.g., by bypassing the register within the driver).

In block 545, the system is capable of determining whether the total number of loads of the selected net exceeds a maximum load threshold. In response to determining that the total number of loads of the selected net exceeds the maximum load threshold, method 500 continues to block 550. In response to determining that the total number of loads of the selected net does not exceed the maximum load threshold, method 500 loops back to block 510 to continue processing further nets of the collection.

In block 555, the system is capable of replicating the pulled-out register. For example, the system is capable of inserting an additional register into the circuit design. The system is capable of apportioning the loads of the selected net among the register inserted in block 540 and the register inserted in block 550. Each of the inserted registers is capable of driving a subset of the loads of the selected net as described in connection with FIG. 5. After block 555, method 500 may loop back to block 510 to continue processing.

Once the system completes the example operations illustrated in FIG. 5, the system may perform further operations on the circuit design such as routing, further optimizations, bitstream generation, and/or other operations for implementing the circuit design within a programmable IC, an ASIC, or other target IC. Accordingly, the system, or another system, is capable of implementing the circuit design within the target IC.

Figure 6:
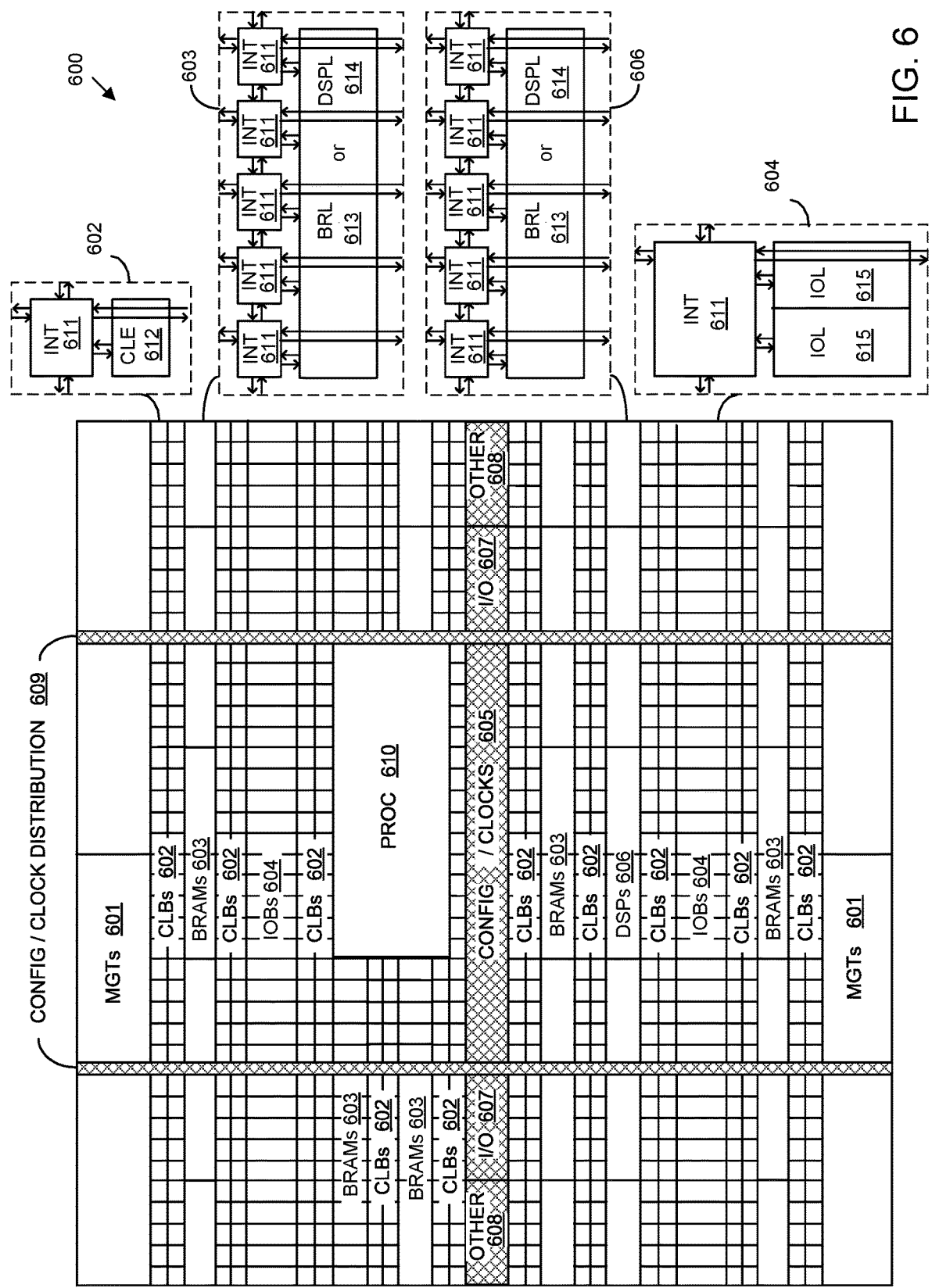
FIG. 6 illustrates an example architecture for an integrated circuit.

FIG. 6 illustrates an example architecture 600 for an IC. A circuit design processed using the example techniques described herein may be implemented within an IC having an architecture the same as, or similar to, that of architecture 600. Architecture 600 illustrates the varied spacing that may occur between macro circuit blocks such as BRAMs and DSPs as also illustrated in FIG. 1.

In one aspect, architecture 600 may be implemented within a programmable IC. For example, architecture 600 may be used to implement a field programmable gate array (FPGA). Architecture 600 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 600 includes several different types of programmable circuit, e.g., logic, blocks. For example, architecture 600 may include a large number of different programmable tiles including multi-gigabit transceivers (MGTs) 601, configurable logic blocks (CLBs) 602 (e.g., which include one or more registers), random access memory blocks (BRAMs and also referred to as "block random access memories") 603, input/output blocks (IOBs) 604, configuration and clocking logic (CONFIG/CLOCKS) 605, digital signal processing blocks (DSPs) 606, specialized I/O blocks 607 (e.g., configuration ports and clock ports), and other programmable logic 608 such as digital clock managers, analog-to-digital converters, system monitoring logic, and so forth.

In some ICs, each programmable tile includes a programmable interconnect element (INT) 611 having standardized connections to and from a corresponding INT 611 in each adjacent tile. Therefore, INTs 611, taken together, implement the programmable interconnect structure for the illustrated IC. Each INT 611 also includes the connections to and from the programmable logic element within the same tile, as shown by the examples included at the top of FIG. 6.

For example, a CLB 602 may include a configurable logic element (CLE) 612 that may be programmed to implement user logic plus a single INT 611. A BRAM 603 may include a BRAM logic element (BRL) 613 in addition to one or more INTs 611. Typically, the number of INTs 611 included in a tile depends on the height of the tile. As pictured, a BRAM tile has the same height as five CLBs, but other numbers (e.g., four) also may be used. A DSP tile 606 may include a DSP logic element (DSPL) 614 in addition to an appropriate number of INTs 611. An IOB 604 may include, for example, two instances of an I/O logic element (IOL) 615 in addition to one instance of an INT 611. The actual I/O pads connected to IOL 615 may not be confined to the area of IOL 615.

In the example pictured in FIG. 6, a columnar area near the center of the die, e.g., formed of regions 605, 607, and 608, may be used for configuration, clock, and other control logic. Horizontal areas 609 extending from this column may be used to distribute the clocks and configuration signals across the breadth of the programmable IC.

Some ICs utilizing the architecture illustrated in FIG. 6 include additional logic blocks that disrupt the regular columnar structure making up a large part of the IC. The additional logic blocks may be programmable blocks and/or dedicated circuitry. For example, a processor block depicted as PROC 610 spans several columns of CLBs and BRAMs.

In one aspect, PROC 610 may be implemented as dedicated circuitry, e.g., as a hardwired processor, that is fabricated as part of the die that implements the programmable circuitry of the IC. PROC 610 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 610 may be omitted from architecture 600 and replaced with one or more of the other varieties of the programmable blocks described. Further, such blocks may be utilized to form a "soft processor" in that the various blocks of programmable circuitry may be used to form a processor that can execute program code as is the case with PROC 610.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 6 that are external to PROC 610 such as CLBs 602 and BRAMs 603 are considered programmable circuitry of the IC and/or include programmable elements.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 610.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 610 or a soft processor. In some cases, architecture 600 includes a dedicated configuration processor that loads the configuration bitstream to the appropriate configuration memory and/or processor memory. The dedicated configuration processor does not execute user-specified program code. In other cases, architecture 600 may utilize PROC 610 to receive the configuration bitstream, load the configuration bitstream into appropriate configuration memory, and/or extract program code for execution.

FIG. 6 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 6 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 610 within the IC are for purposes of illustration only and are not intended as limitations.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one or more embodiments, a method can include determining, using computer hardware, a net of a circuit design having a driver that is a macro circuit block driving a plurality of loads and determining, using the computer hardware, a placement difficulty of the net based upon a type of the driver and number and type of the plurality of loads.

The method can include, in response to determining that the placement difficulty of the net exceeds a threshold placement difficulty, modifying, using the computer hardware, the circuit design by pulling a register from the driver to a location on a device external to the driver and changing internal logic of the driver based upon the pulled register.

In an aspect, the pulled register drives the plurality of loads.

In another aspect, the method may include, in response to determining that a total number of loads of the net exceeds a maximum load threshold, replicating the pulled register, wherein a first subset of the plurality of loads are driven by the pulled register and a second subset of the plurality of loads are driven by the replicated, pulled register.

In another aspect, determining the placement difficulty of the net may include summing a placement difficulty of the driver with a placement difficulty of the plurality of loads.

In another aspect, the method may include determining the placement difficulty of the driver by dividing a number of primitives of the type of the driver in a device by a total number of primitives across types in the device.

In another aspect, the method may include determining the placement difficulty of the plurality of loads by, for each load of the plurality of loads, determining a result of dividing a number of primitives of a type of the load in the device by a total number of primitives across types in the device, and summing the results.

In another aspect, the method may include adjusting each result in the summing by a weight that is specific to the type of primitive of each load.

In one or more embodiments, a system includes a memory configured to store program code and a processor coupled to the memory. The processor, in response to executing the program code, is configured to initiate operations. The operations can include determining a net of a circuit design having a driver that is a sequential circuit block driving a plurality of loads and determining a placement difficulty of the net based upon a type of the driver and number and type of the plurality of loads. The operations can include, in response to determining that the placement difficulty of the net exceeds a threshold placement difficulty, modifying the circuit design by pulling a register from the driver to a location on a device external to the driver and changing internal logic of the driver based upon the pulled register.

In an aspect, the pulled register drives the plurality of loads.

In another aspect, the processor is configured to initiate operations that may include, in response to determining that a total number of loads of the net exceeds a maximum load threshold, replicating the pulled register, wherein a first subset of the plurality of loads are driven by the pulled register and a second subset of the plurality of loads are driven by the replicated, pulled register.

In another aspect, determining the placement difficulty of the net may include summing a placement difficulty of the driver with a placement difficulty of the plurality of loads.

In another aspect, the processor is configured to initiate operations that may include determining the placement difficulty of the driver by dividing a number of primitives of the type of the driver in a device by a total number of primitives across types in the device.

In another aspect, the processor is configured to initiate operations that may include determining the placement difficulty of the plurality of loads by, for each load of the plurality of loads, determining a result of dividing a number of primitives of a type of the load in the device by a total number of primitives across types in the device, and summing the results.

In another aspect, the processor is configured to initiate operations that may include adjusting each result in the summing by a weight that is specific to the type of primitive of each load.

In one or more embodiments, a computer program product includes a computer readable storage medium having program code stored thereon. The program code is executable by a processor to perform operations. The operations can include determining a net of a circuit design having a driver that is a sequential circuit block driving a plurality of loads and determining a placement difficulty of the net based upon a type of the driver and number and type of the plurality of loads. The operations can include, in response to determining that the placement difficulty of the net exceeds a threshold placement difficulty, modifying the circuit design by pulling a register from the driver to a location on a device external to the driver and changing internal logic of the driver based upon the pulled register.

In an aspect, the pulled register drives the plurality of loads.

In another aspect, the program code is executable by the computer hardware to initiate operations that may include, in response to determining that a total number of loads of the net exceeds a maximum load threshold, replicating the pulled register, wherein a first subset of the plurality of loads are driven by the pulled register and a second subset of the plurality of loads are driven by the replicated, pulled register.

In another aspect, determining the placement difficulty of the net may include summing a placement difficulty of the driver with a placement difficulty of the plurality of loads.

In another aspect, the program code is executable by the computer hardware to initiate operations that may include determining the placement difficulty of the driver by dividing a number of primitives of the type of the driver in a device by a total number of primitives across types in the device.

In another aspect, the program code is executable by the computer hardware to initiate operations that may include determining the placement difficulty of the plurality of loads by, for each load of the plurality of loads, determining a result of dividing a number of primitives of a type of the load in the device by a total number of primitives across types in the device, and summing the results, and adjusting each result in the summing by a weight that is specific to the type of primitive of each load.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   determining, using computer hardware, a net of a circuit design having a driver that is a macro circuit block driving a plurality of loads;
   determining, using the computer hardware, a placement difficulty of the net based upon a placement difficulty of the driver and a placement difficulty of the plurality of loads;
   wherein the placement difficulty of the driver depends on a number of primitives of a same type as the driver in a device and a total number of primitives across types in the device;
   wherein the placement difficulty of the plurality of loads depends on, for each load of the plurality of loads, a number of primitives of a same type as the load in the device and a total number of primitives across types in the device; and
   in response to determining that the placement difficulty of the net exceeds a threshold placement difficulty, modifying, using the computer hardware, the circuit design by pulling a register from the driver to a location on the device external to the driver and changing internal logic of the driver based upon the pulled register.

2. The method of claim 1, wherein the pulled register drives the plurality of loads.

3. The method of claim 1, further comprising:
   in response to determining that a total number of the plurality of loads of the net exceeds a maximum load threshold, replicating the pulled register, wherein a first subset of the plurality of loads are driven by the pulled register and a second subset of the plurality of loads are driven by the replicated, pulled register.

4. The method of claim 1, wherein the determining the placement difficulty of the net comprises:
   summing the placement difficulty of the driver with the placement difficulty of the plurality of loads.

5. The method of claim 4, further comprising:
   determining the placement difficulty of the driver by dividing the number of primitives of the same type as the driver in the device by the total number of primitives across types in the device.

6. The method of claim 4, further comprising:
   determining the placement difficulty of the plurality of loads by;
      for each load of the plurality of loads, determining a result of dividing the number of primitives of the same type as the load in the device by the total number of primitives across types in the device; and
      summing the results.

7. The method of claim 6, further comprising:
   adjusting each result in the summing by a weight that is specific to the type of primitive of each load.

8. A system, comprising:
   a processor configured to initiate operations including:
   determining a net of a circuit design having a driver that is a sequential circuit block driving a plurality of loads;
   determining a placement difficulty of the net based upon a placement difficulty of the driver and a placement difficulty of the plurality of loads;
   wherein the placement difficulty of the driver depends on a number of primitives of a same type as the driver in a device and a total number of primitives across types in the device;
   wherein the placement difficulty of the plurality of loads depends on, for each load of the plurality of loads, a number of primitives of a same type as the load in the device and a total number of primitives across types in the device; and in response to determining that the placement difficulty of the net exceeds a threshold placement difficulty, modifying the circuit design by pulling a register from the driver to a location on the device external to the driver and changing internal logic of the driver based upon the pulled register.

9. The system of claim 8, wherein the pulled register drives the plurality of loads.

10. The system of claim 8, wherein the processor is configured to initiate operations further comprising:

in response to determining that a total number of the plurality of loads of the net exceeds a maximum load threshold, replicating the pulled register, wherein a first subset of the plurality of loads are driven by the pulled register and a second subset of the plurality of loads are driven by the replicated, pulled register.

11. The system of claim 8, wherein the determining the placement difficulty of the net comprises:

summing the placement difficulty of the driver with the placement difficulty of the plurality of loads.

12. The system of claim 11, wherein the processor is configured to initiate operations further comprising:

determining the placement difficulty of the driver by dividing the number of primitives of the same type as the driver in the device by the total number of primitives across types in the device.

13. The system of claim 11, wherein the processor is configured to initiate operations further comprising:

determining the placement difficulty of the plurality of loads by;

for each load of the plurality of loads, determining a result of dividing the number of primitives of the same type as the load in the device by the total number of primitives across types in the device; and summing the results.

14. The system of claim 13, wherein the processor is configured to initiate operations further comprising:

adjusting each result in the summing by a weight that is specific to the type of primitive of each load.

15. A computer program product, comprising:

a computer readable storage medium having program code stored thereon, the program code executable by computer hardware to initiate operations including:

determining a net of a circuit design having a driver that is a sequential circuit block driving a plurality of loads;

determining a placement difficulty of the net based upon a placement difficulty of the driver and a placement difficulty of the plurality of loads;

wherein the placement difficulty of the driver depends on a number of primitives of a same type as the driver in a device and a total number of primitives across types in the device; and wherein the placement difficulty of the plurality of loads depends on, for each load of the plurality of loads, a number of primitives of a same type as the load in the device and a total number of primitives across types in the device; and in response to determining that the placement difficulty of the net exceeds a threshold placement difficulty, modifying the circuit design by pulling a register from the driver to a location on the device external to the driver and changing internal logic of the driver based upon the pulled register.

16. The computer program product of claim 15, wherein the pulled register drives the plurality of loads.

17. The computer program product of claim 15, wherein the program code is executable by the computer hardware to initiate operations further comprising:

in response to determining that a total number of the plurality of loads of the net exceeds a maximum load threshold, replicating the pulled register, wherein a first subset of the plurality of loads are driven by the pulled register and a second subset of the plurality of loads are driven by the replicated, pulled register.

18. The computer program product of claim 15, wherein the determining the placement difficulty of the net comprises:

summing the placement difficulty of the driver with the placement difficulty of the plurality of loads.

19. The computer program product of claim 18, wherein the program code is executable by the computer hardware to initiate operations further comprising:

determining the placement difficulty of the driver by dividing the number of primitives of the same type as the driver in the device by the total number of primitives across types in the device.

20. The computer program product of claim 18, wherein the program code is executable by the computer hardware to initiate operations further comprising:

determining the placement difficulty of the plurality of loads by:

for each load of the plurality of loads, determining a result of dividing the number of primitives of the same type as the load in the device by the total number of primitives across types in the device, and summing the results; and adjusting each result in the summing by a weight that is specific to the type of primitive of each load.

* * * * *